United States Patent
Basine

(10) Patent No.: US 8,155,592 B2
(45) Date of Patent: Apr. 10, 2012

(54) METHOD FOR TRANSMITTING LOW-FREQUENCY DATA IN A WIRELESS INTERCOM SYSTEM

(75) Inventor: Bob Basine, Waverly, NE (US)

(73) Assignee: Robert Bosch GmbH, Stuttgart (DE)

( * ) Notice: Subject to any disclaimer, the term of this patent is extended or adjusted under 35 U.S.C. 154(b) by 477 days.

(21) Appl. No.: 12/400,284

(22) Filed: Mar. 9, 2009

(65) Prior Publication Data

US 2009/0258599 A1    Oct. 15, 2009

Related U.S. Application Data

(60) Provisional application No. 61/044,345, filed on Apr. 11, 2008.

(51) Int. Cl.
*H04B 7/24* (2006.01)
(52) U.S. Cl. .......................................... 455/42; 455/118
(58) Field of Classification Search .................. 455/118, 455/41.3, 42
See application file for complete search history.

(56) References Cited

U.S. PATENT DOCUMENTS

| | | | |
|---|---|---|---|
| 5,485,129 A | | 1/1996 | Franson et al. |
| 5,673,323 A | * | 9/1997 | Schotz et al. ..................... 381/2 |
| 5,710,998 A | | 1/1998 | Opas |
| 6,130,859 A | | 10/2000 | Sonnenschein et al. |
| RE36,973 E | | 11/2000 | Shigemori |
| 7,031,394 B2 | | 4/2006 | Vitenberg |
| 7,039,372 B1 | | 5/2006 | Sorrells et al. |

(Continued)

FOREIGN PATENT DOCUMENTS

| EP | 1933470 | 6/2008 |
|---|---|---|
| GB | 2120046 | 11/1983 |

OTHER PUBLICATIONS

Al-Nuaimi, M.O. et al., "A Multiplex System for Simultaneous Voice and Data Transmission using Narrowband FM in Private Mobile Radio", Conference Proceedings on Area Communication, EUROCON 88., 8th European Conference on Electrotechnics, pp. 371-374, Jun. 1988.
Al-Nuaimi, M.O. et al., "Simultaneous Voice and Data Transmission in Private Mobile Radio using a Narrowband FM Channel", Radar and Signal Processing, IEE Proceedings F, vol. 135, pp. 439-449, Oct. 1988.
Levine, S. et al., "Narrowband FM Cellular System", 40th IEEE Vehicular Technology Conference, pp. 237-243, May 1990.

*Primary Examiner* — Dinh T. Le
(74) *Attorney, Agent, or Firm* — Michael Best & Friedrich LLP

(57) ABSTRACT

A wireless communication system including a transmitter and a receiver. The transmitter includes a first mixing module, a phase-locked loop module, reference oscillator, and a second mixing module. The first mixing module is configured to combine a low-frequency data signal and an audio signal, and to generate a first combined signal. The phase-locked loop module is configured to generate a phase error signal based on a reference signal and a frequency modulated signal. The reference oscillator generates the reference signal having a frequency based on the low-frequency data signal. The second mixing module is configured to combine the first combined signal and the phase error signal, and to generate a second combined signal. The transmitter generates the frequency modulated signal based on the second combined signal and transmits the frequency modulated signal. The receiver is configured to receive the frequency modulated signal, and extract the low-frequency data signal and the audio signal.

18 Claims, 5 Drawing Sheets

U.S. PATENT DOCUMENTS

| | | |
|---|---|---|
| 7,139,541 B2 | 11/2006 | Burgess |
| 7,149,289 B2 | 12/2006 | Goodman et al. |
| 7,423,983 B1 | 9/2008 | Li et al. |
| 7,509,101 B2 * | 3/2009 | Bellaouar et al. .......... 455/127.1 |
| 2002/0094034 A1 | 7/2002 | Moriyama |
| 2007/0030116 A1 | 2/2007 | Feher |
| 2007/0258398 A1 | 11/2007 | Chesnutt et al. |
| 2008/0043868 A1 | 2/2008 | Feher |
| 2008/0074990 A1 | 3/2008 | Kowalski et al. |
| 2008/0146164 A1 | 6/2008 | Rofougaran |

* cited by examiner

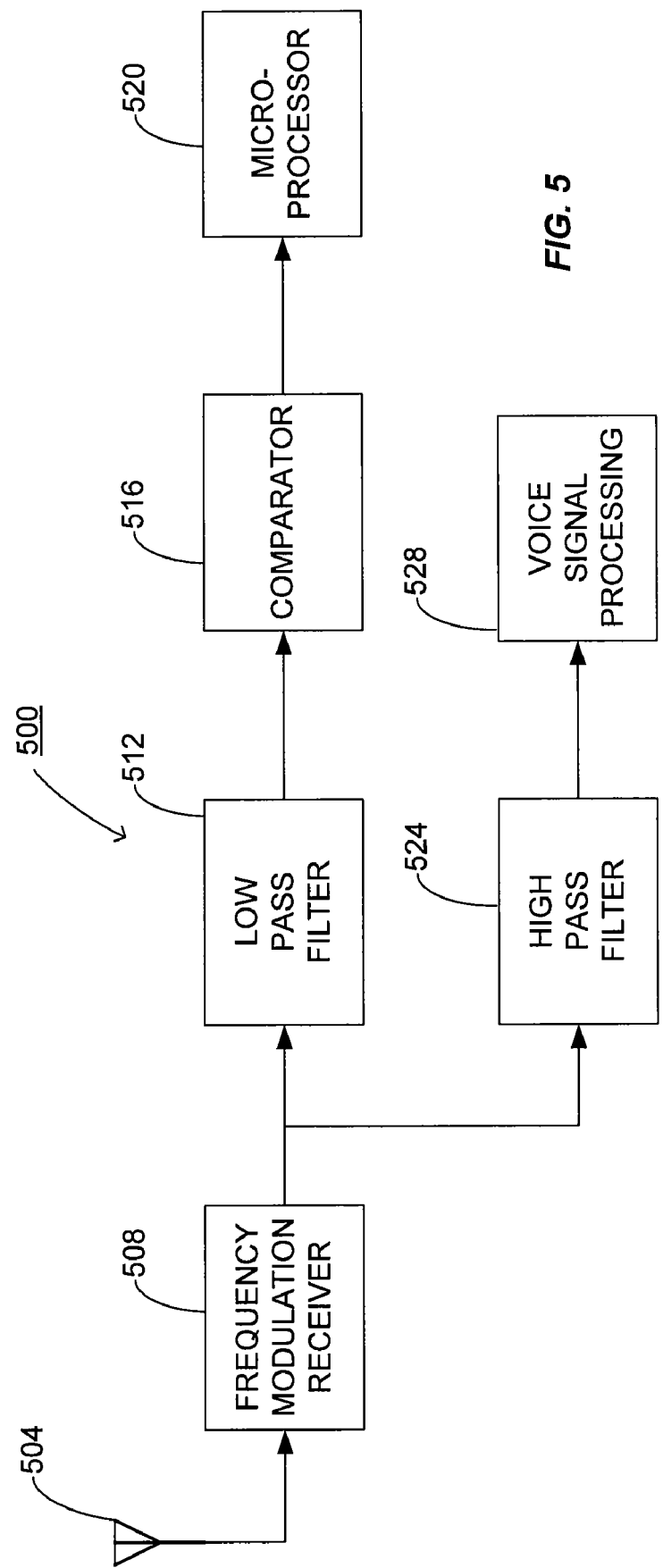

METHOD FOR TRANSMITTING LOW-FREQUENCY DATA IN A WIRELESS INTERCOM SYSTEM

RELATED APPLICATION

The present patent application claims the benefit of prior filed co-pending U.S. provisional patent application Ser. No. 61/044,345, filed on Apr. 11, 2008; the entire contents of which are hereby incorporated by reference.

BACKGROUND

The invention relates to intercom systems, and particularly, to transmission of low-frequency data in intercom systems.

In intercom systems, communication radios that operate in narrow bandwidths often use sub-audible tones or low-frequency tones for signaling information, and relatively higher frequency signals for voice information. The tones are generally retrieved from the voice signals (or audio signals) by means of filtering.

In an intercom system, a user wearing a belt pack (i.e., a portable radio unit) talks into an associated microphone, and pushes one or mores buttons of the belt pack, which causes different tones to be sent out along with the voice. When a base station receives the tones (and voice signals) from the belt pack, circuits in the base station decode the received signals. Depending on the decoded tone, the base station routes the corresponding voice signals to an audio channel associated with the decoded tone. In an intercom system having three channels (for example, an A channel, a B channel, and a stage announce channel), if a user wants to communicate with other users on the A channel, the user presses a button associated with the A channel thus generating a tone associated with the A channel. The belt pack worn by the user transmits the audio signals together with the tone signals from the user to the base station. The base station receives the tone and audio signals, decodes the tone signals, and directs the audio signal to the other users on the A channel.

SUMMARY

In addition to channel-selection information, it is sometimes useful to send additional information between a belt pack and a base station including, for example, information regarding the state of charge of the batteries in the belt pack. While existing tone signaling is useful for controlling or selecting communication channels, it is sometimes difficult or impossible to send status and other additional information using tone signaling while operating in narrow bandwidths. As a consequence, the inventor(s) attempted to transmit data using low-frequency signals instead of tone signals. Similar to transmitting tone signals, low-frequency data can be separated from the audio signals using filters. However, unlike tone signals, the low-frequency data was found to be more susceptible to degradation due to phase distortion (loss of frequency response).

Addressing the degradation of the low-frequency data signal was found to be challenging due, at least in part, to the requirements related to phase-locked loops ("PLLs"), which are used in intercom systems to generate radio-frequency carriers for transmissions. In the case of frequency modulation ("FM"), a modulating signal is applied to a PLL. There is generally a tradeoff between the lock-up time of the PLL and low-frequency response of the system. The degree to which a PLL-generated carrier can be modulated by a low-frequency signal depends upon a loop cutoff frequency. Frequencies above the loop cutoff frequency modulate the carrier relatively easily, while frequencies below the loop cutoff frequency are, in general, attenuated. The attenuation is similar to that caused by a two-pole, high-pass filter. A two-pole, high-pass filter affects not only the amplitude of a signal, but the phase of the signal as well. To prevent the phase of the data from being distorted excessively requires a loop cutoff frequency so low that it can be difficult to implement. Also, acquisition time, that is, the time that it takes a PLL to lock after a power-up, can be relatively long. Small disturbances or drifting in the PLL can be corrected, but correction takes a relatively long time to accomplish. This lengthy correction causes data recovery problems. In some intercom systems, low latency is a desired characteristic. An extended lock-up time results in an extended latency. However, obtaining a desired (i.e., relatively short) lock-up time was found to be difficult without an undesirable amount of phase distortion of the data in the low-frequency data signal. As a consequence, a different signaling technique was implemented.

In one embodiment, the invention provides an intercom system that modulates both a PLL loop frequency and a reference signal frequency. The intercom system includes a processor that receives inputs from a user, generates low-frequency data based on the inputs, and that directly or indirectly communicates signals wirelessly with an associated base station. In the case of a narrowband ultra-high frequency ("UHF") radio, the system includes one or more temperature compensated crystal oscillator modules that provide the reference signal frequency, which reduces or minimizes a frequency drift of the reference signal. Particularly, the system also includes a trimming module that provides a frequency trimming input to the oscillator modules. Impressing the low-frequency data on the frequency trimming input results in a modulation of the reference signal.

In another embodiment, the invention provides an intercom system that includes a processor, a filtering module, an audio processing module, a mixing module, a reference oscillator, a voltage-controlled oscillator, and a phase-locked loop. The processor generates low-frequency data. The filtering module filters the low-frequency data, while the audio processing module processes an audio input. The mixing module mixes the processed audio input and the filtered data to generate a mixed signal, and feeds a combination of an output of the phased locked loop and the mixed signals to the voltage-controlled oscillator. The reference oscillator receives the filtered data and feeds a reference signal to the phase-locked loop for modulation.

In yet another embodiment, the invention provides a method of communicating low-frequency data in an intercom system having a phase-locked loop. The method includes mixing low-frequency data with an audio signal, trimming the low-frequency data, modulating the trimmed data, and modulating a loop frequency of the phase-locked loop.

In another embodiment, the invention provides a wireless communication system including a transmitter and a receiver. The transmitter includes a first mixing module, a phase-locked loop module, and a second mixing module. The first mixing module is configured to combine a low-frequency data signal and an audio signal, and to generate a first combined signal. The phase-locked loop module is configured to generate a phase error signal based on a reference signal and a frequency modulated signal. The second mixing module is configured to combine the first combined signal and a phase error signal, and to generate a second combined signal. The transmitter generates the frequency modulated signal based on the second combined signal and transmits the frequency modulated signal. The receiver is configured to receive the frequency modulated signal, and extract the low-frequency data signal and the audio signal.

In another embodiment, the invention provides a method of communicating data and audio in a wireless intercom system. The wireless intercom system includes a base station and a portable unit. The method includes the acts of generating a signal indicative of the data, combining the signal indicative of the data with an audio signal to create a first combined signal, generating a reference frequency using the signal indicative of the data, using the reference frequency to generate a phase error signal, combining the first combined signal with the phase error signal to create a second combined signal, frequency modulating the second combined signal, and transmitting the frequency modulated signal.

In another embodiment, the invention provides a transmitter for generating a phase-locked loop signal having a data component and an audio component. The transmitter includes a processor, a reference oscillator, a voice signal processor, a first mixing module, a phase-locked loop module, a second mixing module, and a voltage controlled oscillator. The processor is configured to obtain data from a source and generate a low-frequency signal representative of the data. The reference oscillator is configured to generate a reference signal having a frequency based on the low-frequency signal. The voice signal processor configured to generate an audio signal representative of a received voice signal. The first mixing module is configured to generate a first combined signal comprising the low-frequency signal and the audio signal. The phase-locked loop module is configured to generate a phase error signal based on the reference signal and an output signal. The second mixing module is configured to generate a second combined signal comprising the first combined signal and the phase error signal. The voltage controlled oscillator is configured to generate the output signal by frequency modulating the second combined signal.

Other aspects of the invention will become apparent by consideration of the detailed description and accompanying drawings.

BRIEF DESCRIPTION OF THE DRAWINGS

FIG. 5 shows an exemplary receiver for use with the intercom system of FIG. 1.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Among other things, embodiments of the invention provide a communication system or an intercom system that is capable of transmitting channel-selection information as well as other data such as battery-life information between one or more portable units and a base station.

Figure 1:
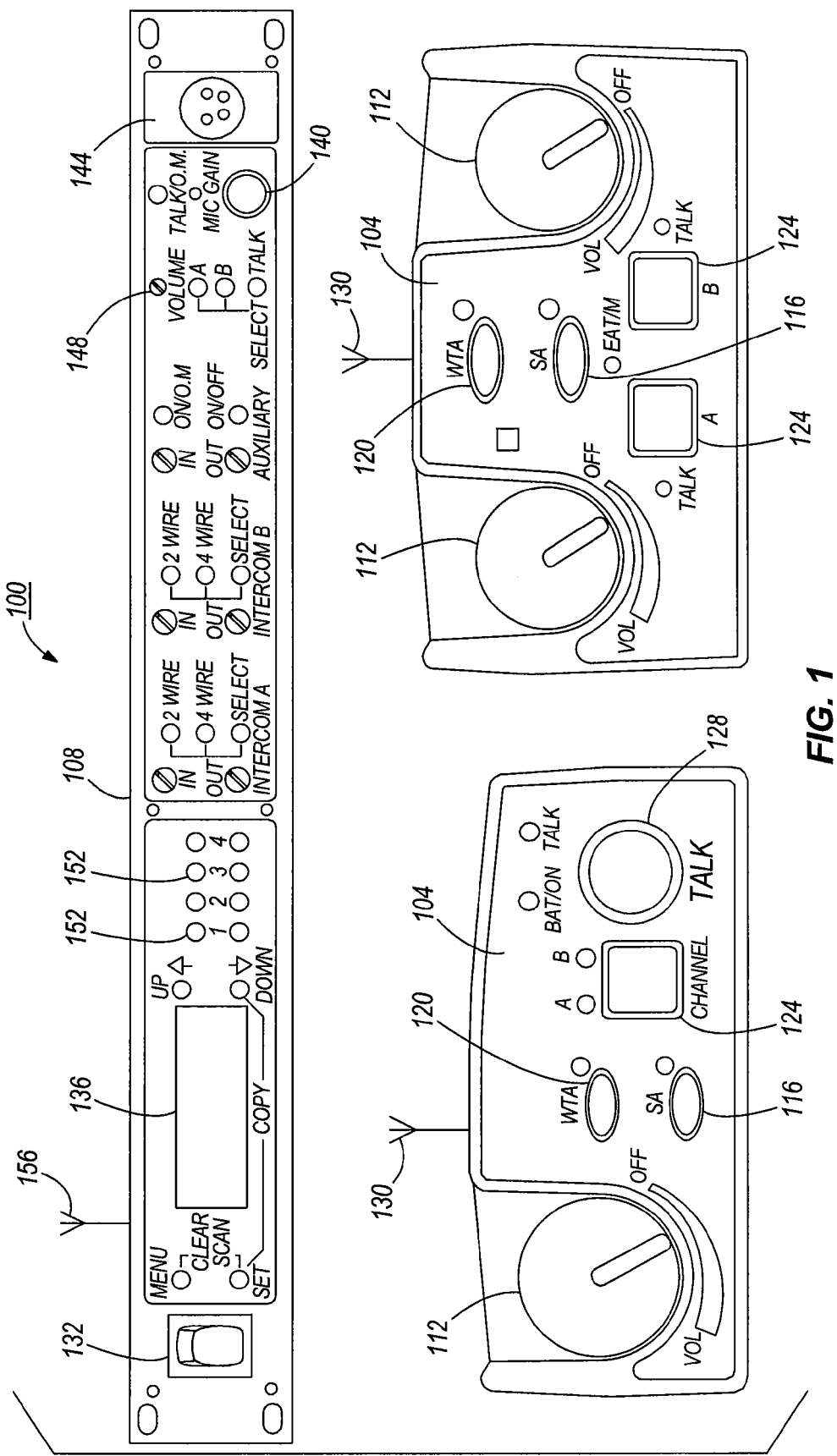
FIG. 1 shows an intercom system including two portable units and a base station.

FIG. 1 shows an intercom system 100 that includes two exemplary portable communication units 104 and an exemplary base station 108. Each of the exemplary portable communication units 104 includes a plurality of controls, such as, for example, one or more On/Off and volume controls 112 that turn the portable unit 104 on and control headset volume, and a stage announce control 116 that allows a user to communicate directly with some predetermined inputs such as a stage announce connector of the base station 108. The portable communication unit 104 also includes other controls, such as, for example, a wireless talk around ("WTA") control 120 that, while pressed, allows a user to communicate with another portable communication unit 104 that is tuned to a specific communication channel, which is controlled by one or more channel selectors 124. Each of the portable communication units 104 also includes a talk control 128 that allows a user to communicate through an antenna 130 with other portable communication units 104 in the system 100 tuned to the same communication channel. Although the embodiment shows only the above-identified controls, each of the portable communication unit 104 can include other indicators and/or controls that perform other functions. Furthermore, the above-identified controls only illustrate a portion of the functions available on the communication unit 104. Each of the above-identified controls may include other functions that are not described herein. In many embodiments, each portable communication unit 104 includes a jack, plug, or interface to which a headset (a headphone with a microphone on an attached arm) can be connected.

In the embodiment shown, the base station 108 includes a plurality of controls, such as, for example, a power button 132 that controls power supplied to the base station 108. The base station 108 also includes a display 136 that displays, for example, status information and/or operating parameters of communication between the base station 108 and the portable unit 104. In some embodiments, the display 136 includes a backlit, liquid crystal display ("LCD"), and/or a plurality of color light-emitting-diodes ("LEDs"). As shown, the base station 108 also includes a plurality of other controls and inputs, such as a talk button 140 that allows a headset (not shown) that is connected to the base station 108 at connector input 144 to communicate with the portable unit 104. The base station 108 also includes a headset volume control 148 that controls the volume to the headset that is connected to the connector input 144, and a plurality of portable unit controls 152 that enable or disable a particular portable unit 104. The base station 108 also includes an antenna 156.

In one embodiment, each of the portable communication units 104 and the base station 108 include at least one transmitter and at least one receiver. A transmitter and a receiver that may be used in embodiments of the invention are described below.

Figure 2:
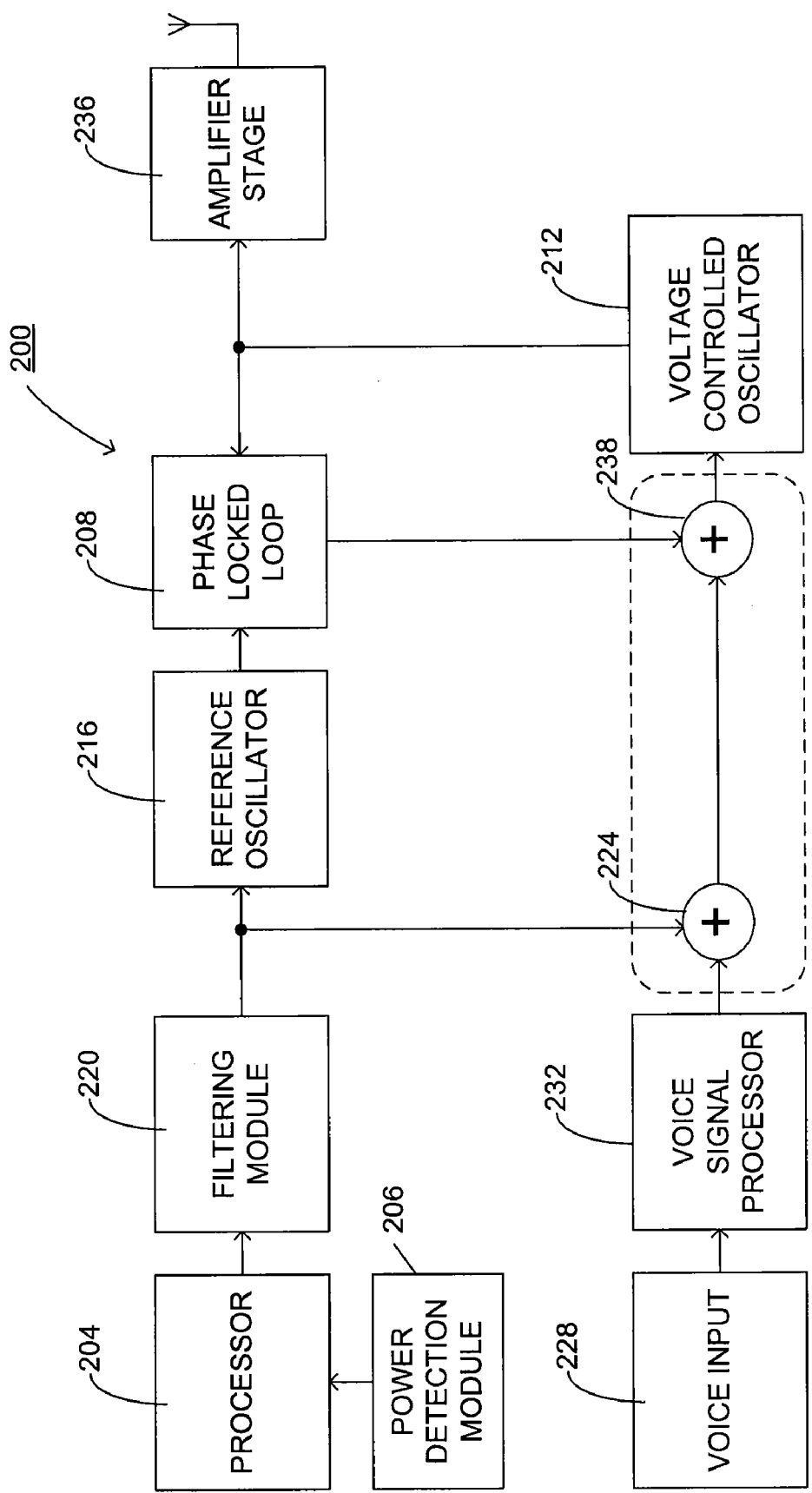
FIG. 2 shows an exemplary transmitter for use with the intercom system of FIG. 1.

FIG. 2 shows an exemplary transmitter 200 for use with the intercom system 100 of FIG. 1. In one embodiment, both the base station 108 and the portable unit 104 include an implementation of the transmitter 200. The transmitter 200 includes a processor 204 that processes signals such as those coming from the controls, such as, for example, the talk buttons 124, 140. The processor 204 also receives information from other sources, such as, for example, a power detection module 206 that determines a status of power (such as power of a battery) being supplied to the portable unit 104, or the base station 108. Although the power detection module 206 is shown as being external to the processor 204 in the embodiment, the power detection module 206 can also be a software and/or hardware module of the processor 204 in other embodiments. The processor 204 then processes the power information, and generates low-frequency binary data that is indicative of that power information. In some embodiments, the low-frequency data has a split-phase, Manchester format of about 62.5 bits per second. In other words the signal has a transmission rate of about 62.5 bits per second. In such cases, a one is represented by a high for about 8 ms followed by a low for about 8 ms. A zero is the reverse of the one signal. A string of ones or zeros is approximately a 62.5 Hz square wave, whereas a 31.25 Hz square wave represents alternating ones and zeros. This format does not generate a DC offset, which makes recovery easier when the data is frequency modulating the carrier.

The transmitter 200 includes a phase-locked loop 208 that modulates both a loop frequency generated by a voltage-controlled oscillator 212 and a reference signal frequency generated by a reference oscillator 216. A filtering module 220 filters the low-frequency data to generate filtered data, and feeds the filtered data to the reference oscillator 216, and a first mixing module 224.

After a voice input 228 has received an audio input from the headset, a voice signal processor 232 processes the audio signal. In some embodiments, the voice signal processor 232 compresses and limits the amplitude of the audio signals to generate a processed signal. The filtered data is subsequently mixed with the processed signal at the first mixing module 224 to produce a processed, mixed signal. The processed, mixed signal is further mixed with a phase error signal from the PLL 208 at a second mixing module 238, which results in a correction signal that is fed to the voltage-controlled oscillator 212. However, there is generally a deviation of the voltage-controlled oscillator 212 arising from the modulation of the reference signal frequency, and a deviation associated with the modulation of the loop. In order to provide a relatively smooth transition in frequency regions adjacent the loop cutoff frequency, the deviations are preferably matched. Therefore, an adjustment of the input level to reference oscillator 216 is provided. In this way, the frequency response of the data extends down to a low level. In some embodiments, the frequency response of the data extends down to a DC (or about 0 Hz) level. In some embodiments, the transmitter 200 includes a jumper moveable between an operating position and a test position. When the jumper is in the test position, an oscilloscope can be connected to the receiver (of FIG. 5) to view the transmitted wave form of the low frequency data. Ideally, the wave form (or wave) should be a square wave where the horizontal sections of the wave are flat. After the deviation of the reference oscillator 216 has been adjusted through a trimming module, such as, for example, a potentiometer, the deviations match. When trimming the deviation is complete, the jumper is typically switched back to an operating position. An amplifier stage 236 amplifies the modulated signal from the voltage-controlled oscillator 212 for transmission.

Figure 3:
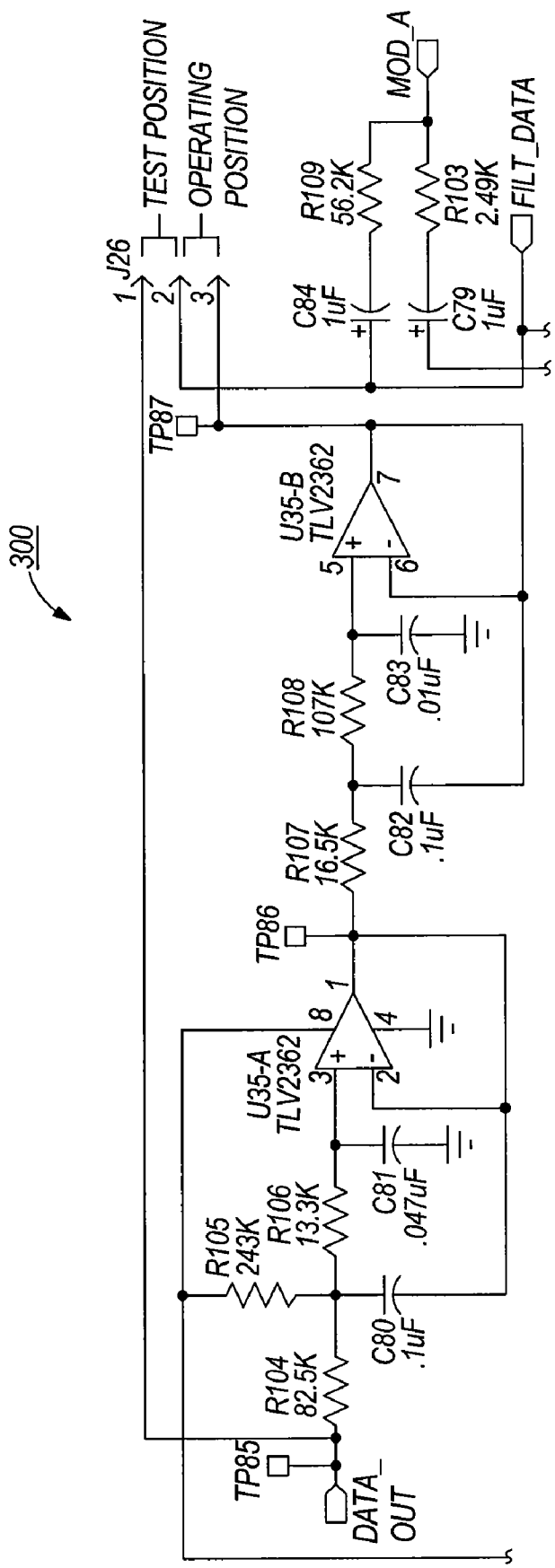
FIG. 3 shows an exemplary filtering module for use with the transmitter of FIG. 2.

FIG. 3 shows an exemplary filtering module 300 for use with the transmitter 200 of FIG. 2. In the embodiment shown, the filtering module 300 is a 4-pole low pass filter with a cutoff frequency of about 75 Hz, and receives data from the processor 204 of FIG. 2 at DATA_OUT. R104 and R105 shift a DC operating point from about half of 3.3 volts to about half of 5 volts to keep the data centered between a plurality of op amp rails U35. It should be noted that other voltages can also be used in other embodiments. To ensure desirable recovery of the phase of the data, harmonics are kept out of the voice signal and a maximally flat linear filter, such as, for example, a Bessel filter, is employed. In the embodiment shown, jumper J26 is placed in a test position and the data recovered from a test receiver is displayed on an oscilloscope. After the main deviation has been adjusted, potentiometer VR2 (of FIG. 4) is adjusted so that the tops of the square wave are horizontal or flat, just as would be done to calibrate an oscilloscope probe. Then J26 is placed in the operating position.

Figure 4:
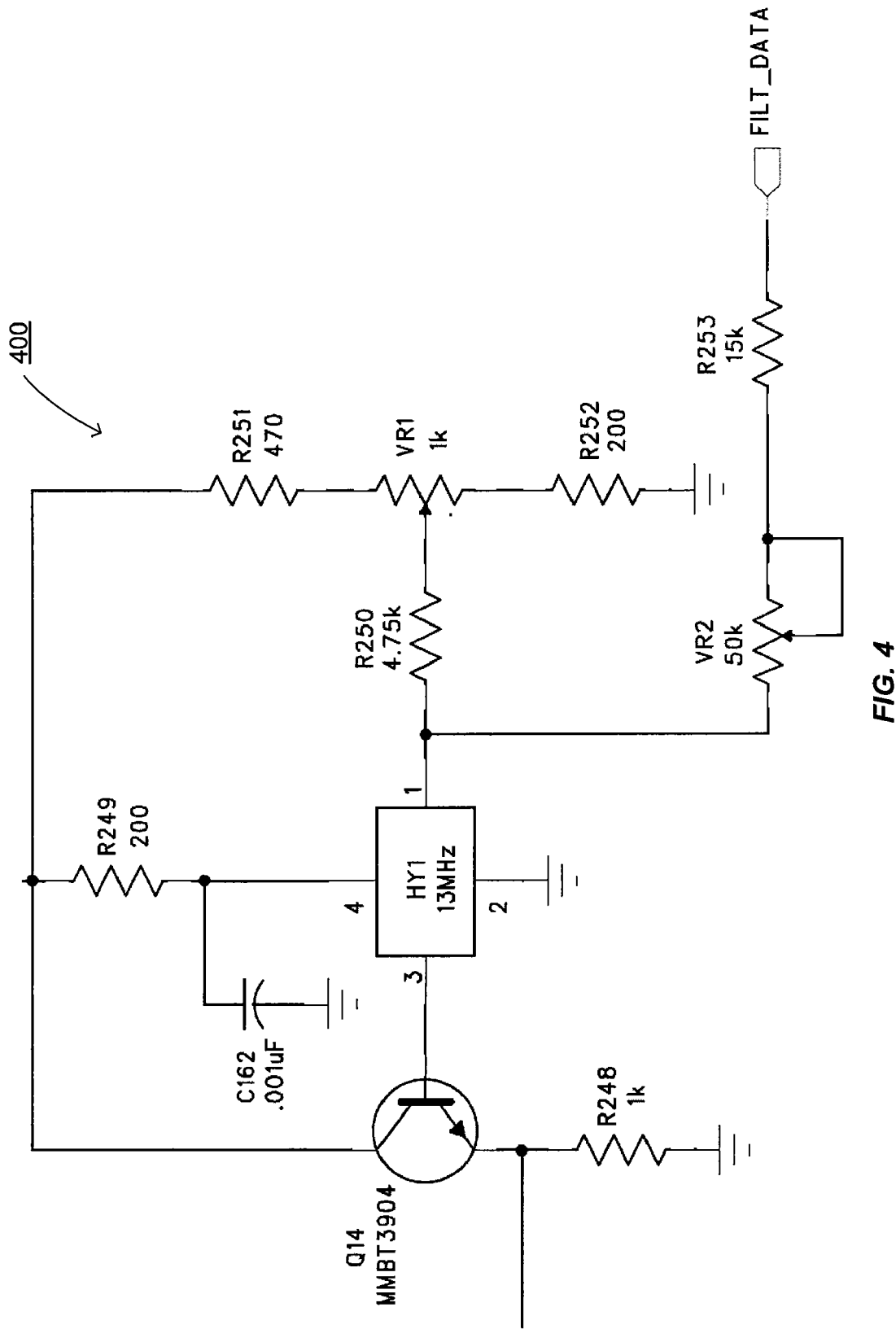
FIG. 4 shows an exemplary reference oscillating module for use with the transmitter of FIG. 2.

FIG. 4 shows an exemplary reference oscillating module 400 for use with the transmitter of FIG. 2 to generate a reference signal. In the embodiment shown, the reference oscillating module 400 is a temperature-compensated, crystal-oscillator ("TCXO"). The reference oscillating module 400 receives an input signal FILT_DATA from the filtering module 220 of FIG. 2. The reference oscillating module 400 also includes the potentiometer VR2 that adjusts or trims the input signal, which is generally a square wave, to have a flat top.

FIG. 5 shows an exemplary receiver 500 for use with the intercom system of FIG. 1. Similar to the transmitter 200, the receiver 500 includes an antenna 504 and a frequency modulation receiver 508 that receives information from the base station 108. The received information is filtered with a low pass filter 512 to produce filtered data. The filtered data thus represents a modulated version of the low-frequency data that the transmitter 200 has transmitted. A floating reference comparator 516 converts the modulated version of the low-frequency data back to a series of square waves, and feeds a processor 520 which decodes the series into the low-frequency data. A high-pass filter 524 filters the received information from the frequency modulation receiver 508, which results in another set of filtered data. A voice signal processor 528 then processes the filtered data and regenerates the audio or voice signal. A headset can then be used to listen to the audio signal that was transmitted.

Various features and advantages of the invention are set forth in the following claims.

What is claimed is:

1. A wireless communication system comprising:
a transmitter including
a first mixing module configured to combine a low-frequency data signal and an audio signal, and to generate a first combined signal,
a phase-locked loop module configured to generate a phase error signal based on a reference signal and a frequency modulated signal,
a reference oscillator configured to generate the reference signal having a frequency based on the low-frequency data signal;
a second mixing module configured to combine the first combined signal and the phase error signal, and to generate a second combined signal;
a voltage controlled oscillator coupled to second mixing module and the phase locked loop for generating the frequency modulated signal based on the second combined signal, and transmitting the frequency modulated signal; and
a receiver configured to receive the frequency modulated signal and extract the low-frequency data signal and the audio signal from the frequency modulated signal.

2. The wireless communication system of claim 1, further comprising a processor configured to obtain data from a source and generate the low-frequency data signal, the low-frequency data signal indicative of the data from the source.

3. The wireless communication system of claim 2, further comprising a power detection module, the power detection module configured to detect a power level of a battery and to provide an indication of the power level to the processor, the processor incorporating the power level into the low-frequency data signal.

4. The wireless communication system of claim 1, wherein the voltage controlled oscillator is configured to generate the frequency modulated signal by frequency modulating the second combined signal.

5. The wireless communication system of claim 1, further comprising a voice signal processor configured to generate the audio signal.

6. The wireless communication system of claim 1, wherein the low-frequency data signal is encoded in a split-phase Manchester format.

7. The wireless communication system of claim 6, wherein the Manchester format has a transmission rate of about 62.5 bits per second.

8. The wireless communication system of claim 1, wherein the low-frequency data signal is filtered a filter.

9. A method of communicating data and audio in a wireless intercom system having a base station and a portable unit, the method comprising:
 generating a signal indicative of the data;
 combining the signal indicative of the data with an audio signal from a voice signal processor to create a first combined signal;
 generating a reference frequency by a oscillator using the signal indicative of the data;
 using the reference frequency to generate a phase error signal by a phase locked loop;
 combining the first combined signal with the phase error signal to create a second combined signal;
 frequency modulating the second combined signal by a voltage controlled oscillator; and
 transmitting the frequency modulated signal.

10. The method of claim 9, further comprising receiving the frequency modulated signal.

11. The method of claim 10, further comprising extracting the audio signal from the received frequency modulated signal.

12. The method of claim 10, further comprising extracting the signal indicative of the data from the received frequency modulated signal.

13. The method of claim 9, wherein the signal indicative of the data is encoded into a split-phase Manchester format.

14. The method of claim 9, wherein the phase error signal is generated based on the reference signal and the frequency modulated signal.

15. A transmitter for generating a phase-locked loop signal having a data component and an audio component, the transmitter comprising:
 a processor coupled to a source and configured to obtain data from the source and generate a low-frequency signal representative of the data;
 a reference oscillator coupled to the processor and configured to generate a reference signal having a frequency based on the low-frequency signal;
 a voice signal processor configured to generate an audio signal representative of a received voice signal;
 a first mixing module coupled to the processor and the voice signal processor and configured to generate a first combined signal comprising the low-frequency signal and the audio signal;
 a phase-locked loop module coupled to the reference oscillator and configured to generate a phase error signal based on the reference signal and an output signal;
 a second mixing module coupled to the first mixing module and the phase-locked loop module and configured to generate a second combined signal comprising the first combined signal and the phase error signal; and
 a voltage controlled oscillator coupled to the second mixing module and the phase-locked loop module and configured to generate the output signal by frequency modulating the second combined signal.

16. The transmitter of claim 15, further comprising a filter configured to filter the low-frequency data signal and provide the filtered low-frequency data signal to the reference oscillator and the first mixing module.

17. The transmitter of claim 15, wherein the source is a power detection module configured to detect a power level of a battery.

18. The transmitter of claim 15, wherein the low-frequency signal is encoded by the processor in a split-phase Manchester format with a transmission rate of about 62.5 bits per second.

* * * * *